(12) United States Patent
Cortequisse (10) Patent No.: US 10,337,340 B2
(45) Date of Patent: Jul. 2, 2019

(54) MIXED STATOR FOR AN AXIAL TURBINE ENGINE COMPRESSOR

(71) Applicant: Techspace Aero S.A., Herstal (Milmort) (BE)

(72) Inventor: Jean-François Cortequisse, Heers (BE)

(73) Assignee: SAFRAN AERO BOOSTERS SA, Herstal (Milmort) (BE)

(*) Notice: Subject to any disclaimer, the term of this patent is extended or adjusted under 35 U.S.C. 154(b) by 621 days.

(21) Appl. No.: 14/926,248

(22) Filed: Oct. 29, 2015

(65) Prior Publication Data

US 2016/0130960 A1    May 12, 2016

(30) Foreign Application Priority Data

Nov. 6, 2014    (BE) ................................... 2014/0806

(51) Int. Cl.
| | |
|---|---|
| *F01D 9/04* | (2006.01) |
| *F01D 25/24* | (2006.01) |
| *F01D 5/02* | (2006.01) |
| *F01D 9/06* | (2006.01) |
| *F01D 11/12* | (2006.01) |

(52) U.S. Cl.
CPC ............... *F01D 9/041* (2013.01); *F01D 5/02* (2013.01); *F01D 9/06* (2013.01); *F01D 11/122* (2013.01); *F01D 25/246* (2013.01); *F05D 2220/323* (2013.01); *F05D 2240/12* (2013.01); *F05D 2240/24* (2013.01); *F05D 2300/40* (2013.01); *F05D 2300/603* (2013.01); *Y02T 50/672* (2013.01); *Y02T 50/673* (2013.01)

(58) Field of Classification Search
None
See application file for complete search history.

(56) References Cited

U.S. PATENT DOCUMENTS

| | | | | |
|---|---|---|---|---|
| 8,414,256 | B2 * | 4/2013 | Cortequisse | ......... B23K 1/0018 |
| | | | | 415/199.5 |
| 8,454,303 | B2 * | 6/2013 | Garcia-Crespo | ........ F01D 9/042 |
| | | | | 415/137 |

(Continued)

FOREIGN PATENT DOCUMENTS

| | | | | |
|---|---|---|---|---|
| EP | 2213840 | A2 * | 8/2010 | ............... F01D 5/28 |
| EP | 2339120 | A1 | 6/2011 | |

OTHER PUBLICATIONS

Search Report dated Jul. 2, 2015 for BE 2014/0806.

*Primary Examiner* — Kayla McCaffrey
(74) *Attorney, Agent, or Firm* — James E. Walton (57) ABSTRACT

The present application relates to a stator for a low-pressure compressor of an axial turbine engine. The stator includes an annular row of stator vanes with connection vanes, and support vanes which are grouped into vaned casings. The casings include internal platforms and external platforms, and are integrally produced by means of additive production based on titanium powder. The stator has a circular internal shroud which is formed by the internal platforms of the vanes of the casings and internal shroud segments which are fixed to the connection vanes. The internal platforms include pairs of contact surfaces in order to interlock the shroud segments therein by moving into abutment and sliding against the contact surfaces. The contact surfaces are perpendicular to the rotation axis and form axial stops.

7 Claims, 4 Drawing Sheets

(56) References Cited

U.S. PATENT DOCUMENTS

| | | | |
|---|---|---|---|
| 8,708,649 B2* | 4/2014 | Wery | F01D 5/282 |
| | | | 415/209.3 |
| 9,556,746 B2* | 1/2017 | Paradis | F01D 9/04 |
| 2009/0208332 A1* | 8/2009 | Weinstein | F01D 9/042 |
| | | | 415/209.3 |
| 2011/0052397 A1* | 3/2011 | Kusters | F01D 5/3038 |
| | | | 416/205 |
| 2011/0171018 A1 | 7/2011 | Garcia-Crespo | |
| 2014/0212284 A1 | 7/2014 | Jamison | |

* cited by examiner

MIXED STATOR FOR AN AXIAL TURBINE ENGINE COMPRESSOR

This application claims priority under 35 U.S.C. § 119 to Belgium Patent Application No. 2014/0806, filed 6 Nov. 2014, titled "Mixed Stator for an Axial Turbine Engine Compressor," which is incorporated herein by reference for all purposes.

BACKGROUND

1. Field of the Application

The present application relates to turbine engines, in particular turbojets for aircraft. The present application more specifically relates to a stator architecture of an axial turbine engine.

2. Description of Related Art

A turbine engine currently has a plurality of annular rows of stator vanes with various architectures. These rows are distinguished by their methods for fixing the vanes to each other, or even the type of connection with an outer housing which supports each vane. In order to channel a primary flow and to ensure sealing with respect to the rotor, a row generally supports an internal shroud which is fixed to the inner ends of the stator vanes. These shrouds are subjected to significant axial forces, in the context of a low-pressure compressor they are subjected to pumping phenomena or occurrences of ingestion.

Document EP2339120A1 discloses an architecture for a low-pressure compressor rectifier of an axial turbine engine. The rectifier has a mixed architecture since, within the same annular row of vanes, it has structuring vanes and aero vanes. The aero vanes are connected to internal shrouds which are themselves fixed to the structuring vanes. The inner composite shrouds are fixed to the metal structuring vanes using shafts, which constitutes a rigid architecture which does not generate any occurrences of aerodynamic disturbance. However, the rigidity of the assembly remains limited.

Although great strides have been made in the area of turbine engines, many shortcomings remain.

DETAILED DESCRIPTION OF THE PREFERRED EMBODIMENT

The present application aims to solve at least one of the problems presented by the prior art. More specifically, an object of the present application is to improve the rigidity of an axial turbine engine stator comprising an annular row of vanes. An object of the present application is also to improve the axial retention of internal shrouds which are fitted between structuring turbine vanes of an axial turbine engine stator.

It will be appreciated that the present application provides an axial blocking between a support vane and a segment of internal shroud as a result of facets which are orientated in an upstream direction and/or in a downstream direction, the facets being at one or each interface between a support vane and a shroud segment.

The present application relates to a stator for an axial turbine engine, in particular a compressor, the stator comprising: an annular row of stator vanes which comprise integral support vanes with internal platforms, and connection vanes; an internal shroud formed by the internal platforms of the support vanes and internal shroud segments which are fixed to the connection vanes; remarkable in that an internal platform of a support vane comprises at least one contact surface which is generally perpendicular to the rotation axis of the turbine engine, and which is axially in contact with an internal segment in order to be able to block it.

The contact surface enables the internal shroud segment to be blocked in that it forms an axial stop for the segment.

According to an advantageous embodiment of the present application, the stator comprises at least one integral vane block which comprises a plurality of support vanes and an internal platform which is common to each of the support vanes thereof, the vane block optionally comprises an external platform which is common to each of the support vanes thereof.

According to an advantageous embodiment of the present application, at least one or each vane block comprises a plurality of, preferably three, support vanes which describe an angular portion of the annular row of vanes, the mean inclination of the chord of each support vane of the vane block relative to the rotation axis is optionally greater than 5°, preferably greater than 10°, more preferably greater than 20°.

According to an advantageous embodiment of the present application, each support vane has a concave intrados surface which is preferably curved inwards in the region of the connection thereof to the inner platform thereof.

According to an advantageous embodiment of the present application, at least one or each internal platform of a support vane comprises at least two contact surfaces which are generally perpendicular to the rotation axis of the turbine engine and which are in contact with the same internal segment, preferably at least one or each internal platform of a support vane comprises at least four contact surfaces which are generally perpendicular to the rotation axis of the turbine engine and which are in contact with two separate internal segments.

According to an advantageous embodiment of the present application, the stator comprises a plurality of contact surfaces which are formed on the internal platforms, the contact surfaces generally being parallel with each other and describing at least one, preferably at least two, circular row(s).

According to an advantageous embodiment of the present application, at least one platform comprises a pair of contact surfaces which are in contact with the same segment and which are orientated axially in opposing directions, optionally the contact surfaces face each other.

According to an advantageous embodiment of the present application, each internal segment is adjusted mechanically to each internal platform with which it is in contact in order to enable retention by means of interlocking, preferably each pair of contact surfaces which cooperates with the same internal segment is adjusted mechanically with the segment in order to enable radial retention by means of interlocking.

According to an advantageous embodiment of the present application, the internal segments are interposed between the internal platforms of support vanes, optionally the segments and the platforms form an alternating arrangement which is generally regular.

According to an advantageous embodiment of the present application, the internal shroud segments comprise openings or cavities in which the connection vanes are fixed, at least one or each fixing between a segment and a connection vane in an opening or a cavity comprises a plate and/or a sealing material and/or an elastomer joint such as silicone.

According to an advantageous embodiment of the present application, the support vanes and the connection vanes each comprise an aerofoil which is intended to extend radially in a primary flow of the turbine engine, the aerofoils having equal maximum thicknesses, preferably the aerofoils are identical.

According to an advantageous embodiment of the present application, each contact surface of the internal platform is configured to enable a radial introduction of an internal segment from the inner side.

According to an advantageous embodiment of the present application, at least one or each internal platform is profiled and comprises a profile which has an axial portion which extends principally axially and two radial portions which extend principally radially towards the inner side from the axial portion, each radial portion being arranged at one of the upstream and downstream ends of the axial portion, each contact surface being formed on one of the radial portions.

According to an advantageous embodiment of the present application, at least one or each support vane is integral, preferably by means of additive production based on powder, optionally a metal powder such as a titanium powder.

According to an advantageous embodiment of the present application, at least one or each internal segment is produced from a composite material, in particular with fibers and an organic matrix such as polyetherimide or polyester.

According to an advantageous embodiment of the present application, the stator comprises sealing joints between the internal platforms and the internal segments, preferably the sealing joints are elastomer joints.

According to an advantageous embodiment of the present application, the stator comprises two internal segments which are in contact with the same internal platform, the internal platform and the segments together define a cell which is optionally open towards the inner side.

According to an advantageous embodiment of the present application, at least one or each segment comprises at least one, preferably a plurality of, corresponding contact surface(s) which is/are intended to move into contact with each contact surface of an associated platform during their assembly.

According to an advantageous embodiment of the present application, at least one or each internal platform comprises an internal groove which is radially open towards the inner side, the segment comprises a portion of smaller radial and/or axial thickness which is introduced into the internal groove of the associated support vane.

According to an advantageous embodiment of the present application, the stator comprises an outer housing which is formed by two half-shells, each provided with a semi-circular wall and axial fixing flanges in order to join the half-shells, an internal platform of a support vane being aligned with each axial flange along the circumference.

According to an advantageous embodiment of the present application, two internal platforms of two support vanes or two different casings are arranged at one side and the other of an interface between axial flanges which are fixed together, optionally the internal platforms are in contact.

According to an advantageous embodiment of the present application, each internal platform has two opposing edges along the circumference of the row of vanes, the support vane corresponding to each platform has at least one or more fixing shaft(s) which is/are arranged remote from the edges, preferably remote from each axial flange of a half-shell.

According to an advantageous embodiment of the present application, each aerofoil is delimited radially by each shroud of the stator.

According to an advantageous embodiment of the present application, at least one or each contact surface which is axially in contact with a segment forms an axial stop for the segment.

According to an advantageous embodiment of the present application, each support vane of a casing comprises a stacking direction, the stacking directions of the support vanes of a casing being regularly inclined relative to each other.

According to an advantageous embodiment of the present application, each half-shell is produced from a composite material having an organic matrix, preferably each half-shell is integral.

The present application also relates to a turbine engine which comprises a stator, remarkable in that the stator is in accordance with the present application, optionally the stator is a stator of a low-pressure compressor.

A contact surface which is orientated in an upstream direction enables the movements of a shroud segment to be blocked in a downstream direction, and vice versa. In particular, a surface which is orientated in a downstream direction limits the movement in an upstream direction of a segment in the case of pumping in a compressor. The combination of two contact surfaces which are orientated in an upstream direction and in a downstream direction limits the axial vibrations of the shroud segment. In this manner, the present application enables the stator to be strengthened by forming axial stops as a result of the contact surfaces.

The integral appearance of the support vanes improves the rigidity of the stator since the play between an aerofoil of a support vane and the corresponding internal platform is eliminated. The additive production method enables the production of more complex shapes, which are inwardly curved to a greater extent, with more variations of thicknesses. A casing with a plurality of vanes produced in this manner will be more resistant and more rigid, which enables the overall rigidity of the associated stator to be further improved. A casing and each support vane forms a reinforcement, a hard location in the stator. The considerations of mass, cost, mechanical strength and repair are also optimized, where applicable together.

In the following description, the terms inner or internal and outer or external refer to a positioning relative to the rotation axis of an axial turbine engine. The axial direction corresponds to the direction along the rotation axis of the turbine engine.

Figure 1:
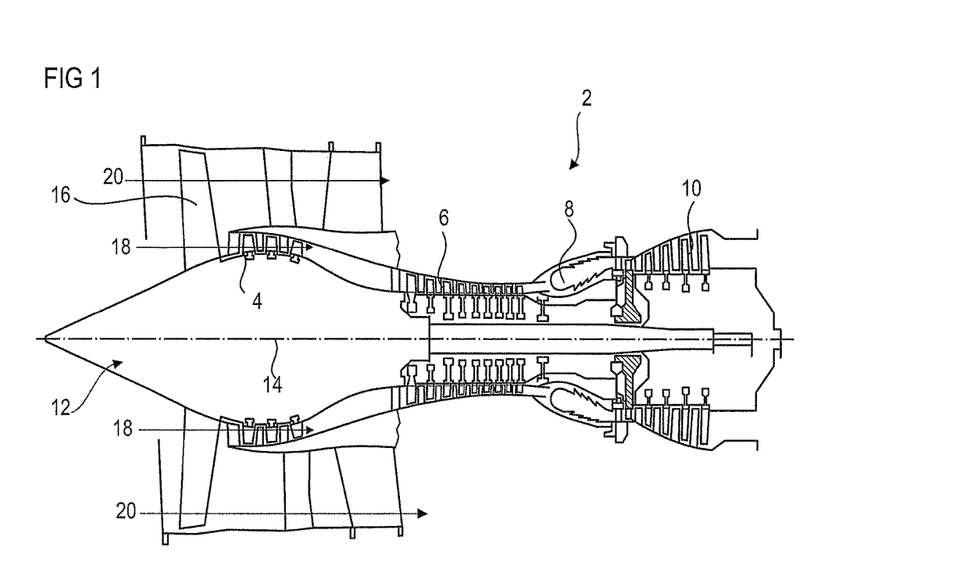
FIG. 1 shows an axial turbine engine according to the present application.

FIG. 1 shows in a simplified manner an axial gas turbine engine. It is in this precise case a dual-flow turbojet. The turbojet 2 comprises a first compression level, referred to as a low-pressure compressor 4, a second compression level, referred to as a high-pressure compressor 6, a combustion chamber 8 and one or more turbine levels 10. During operation, the mechanical power of the turbine 10 transmitted via the central shaft as far as the rotor 12 moves the two compressors 4 and 6. These comprise several rows of rotor blades which are associated with rows of stator vanes. The rotation of the rotor about the rotation axis 14 thereof thus enables a flow of air to be generated and progressively compressed as far as the inlet of the combustion chamber 8. Gear reduction means may increase the rotation speed transmitted to the compressors.

An inlet ventilator which is generally referred to as a fan or ventilator 16 is coupled to the rotor 12 and generates a flow of air which is divided into a primary flow 18 which passes through the above-mentioned different levels of the turbine engine and a secondary flow 20 which passes through an annular conduit (partially illustrated) along the machine in order to then join the primary flow at the outlet of the turbine. The secondary flow may be accelerated in order to generate a pushing reaction. The primary flow 18 and secondary flow 20 are annular flows. They are channeled via the housing of the turbine engine. To this end, the housing has cylindrical walls or shrouds which may be internal and external.

Figure 2:
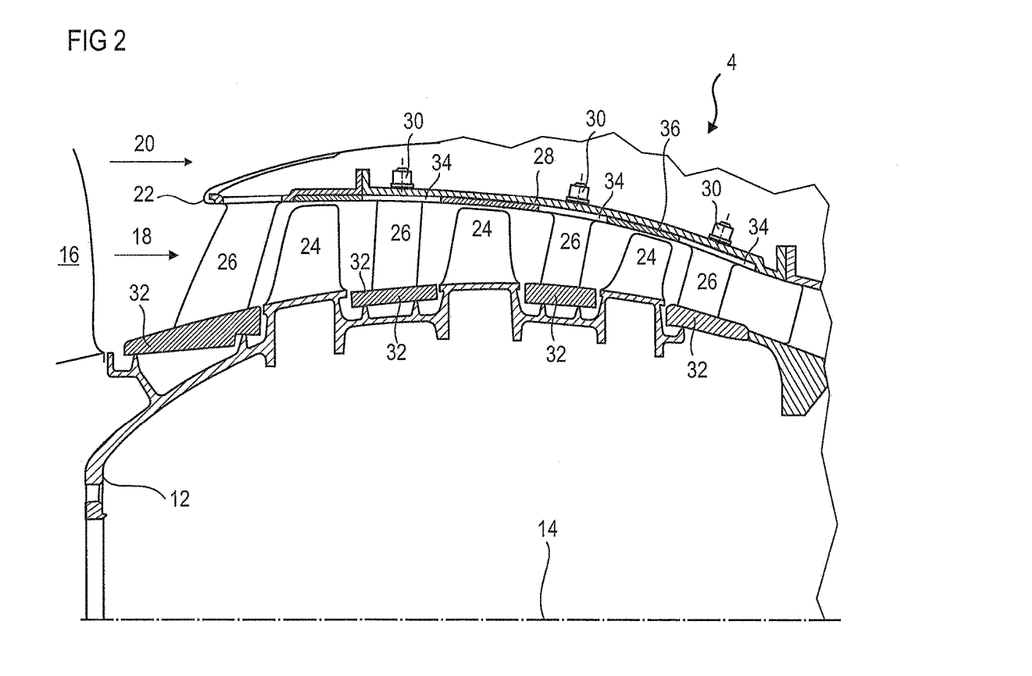
FIG. 2 is a diagram of a turbine engine compressor according to the present application.

FIG. 2 is a sectioned view of a compressor of an axial turbine engine such as that of FIG. 1. The compressor may be a low-pressure compressor 4. It is possible to see therein a portion of the fan 16 and the separation nozzle 22 of the primary flow 18 and the secondary flow 20. The rotor 12 comprises a plurality of annular rows of rotor blades 24, in this instance three.

The low-pressure compressor 4 comprises a stator with an external housing 28. This may mechanically support a plurality of rectifiers, in this instance four, which each contain an annular row of stator vanes 26. The rectifiers are associated with the fan 16 or a row of rotor blades in order to rectify the flow of air, in order to convert the speed of the flow in terms of static pressure. The stator vanes 26 extend substantially radially from an outer housing 28, and may be fixed thereto using shafts 30.

The stator of the compressor 4 further comprises internal shrouds 32 which are each connected to the internal ends of the stator vanes 26 whilst the external ends may be connected to external shrouds 34. Optionally, some vanes are connected individually to the external housing via a separate fixing platform. The internal shrouds 32 may be covered at the inner side with tracks of abradable material in order to form a sealing joint which cooperates with labyrinth-like seals which are formed on the external surface of the rotor 12.

Figure 3:
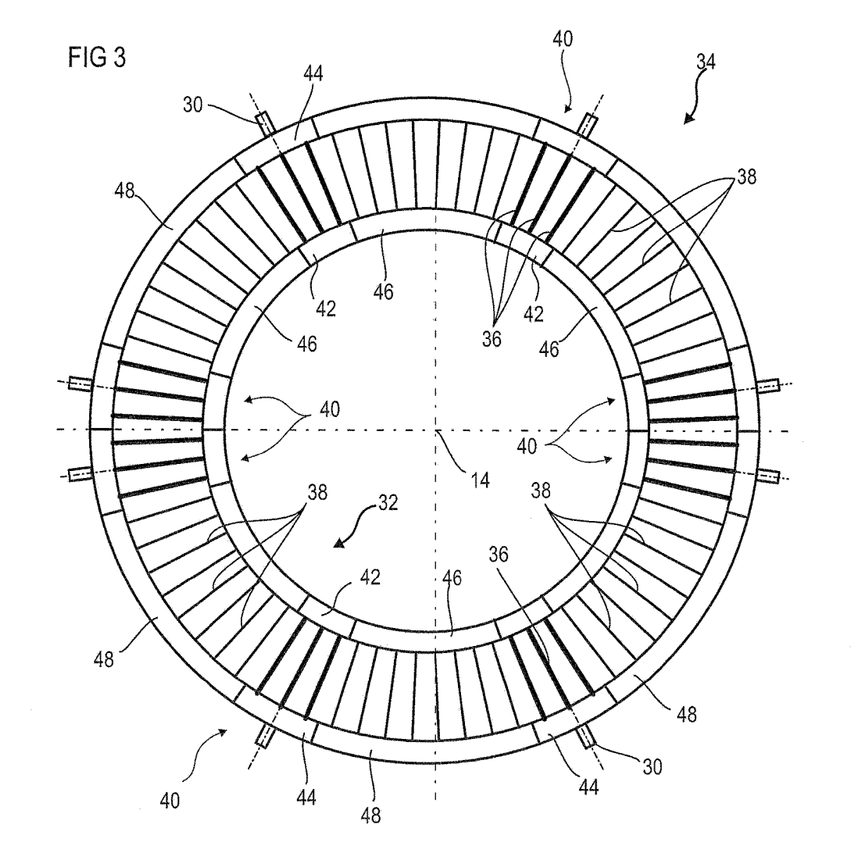
FIG. 3 shows a row of vanes of a stator according to the present application.

FIG. 3 shows a portion of the stator of a compressor, such as that described in FIG. 2. It is possible to see therein an annular row of vanes, an external shroud 34 and an internal shroud 32. The stator is seen along the rotation axis 14 of the turbine engine which may coincide with the axis of symmetry of the stator or the vane row.

The annular row of vanes of the stator comprises a plurality of types of stator vanes including support vanes 36 and connection vanes 38. The stator vanes (36; 38) are indicated using lines which illustrate their leading edges. In a random manner, the support vanes 36 are illustrated using a thicker line than the connection vanes 38, but in practice the vanes of the row are of the same thickness, for example, of the same maximum thickness, the same geometry in order to prevent occurrences of heterogeneity being formed in the annular flow. Advantageously, the vanes of the same row are identical.

The vanes (36; 38) of the row are regularly spaced apart from each other and have the same angular orientation in the flow. They may be inclined regularly with respect to each other. Although seventy-two stator vanes (36; 38) are illustrated, the row may comprise more, for example, more than a hundred vanes. Alternatively, the row may comprise fewer vanes, for example, less than fifty.

The connection vanes 38 are distributed over several continuous groups, in this instance six groups of eight connection vanes 38. The support vanes 36 may be combined in vane blocks 40 which may be produced in an integral manner by welding different portions. In this manner, they form a rigid and durable mechanical connection between the external housing and the internal shroud 32. They act as pillars between the external housing and the internal shroud 32.

Each vane block 40 may comprise one, or preferably a plurality of, support vane(s) 38, in this instance three support vanes 38. This number of three support vanes 40 optimizes the rigidity of the vane block and the mass of the stator, as a result of the radial inclination of the vanes, their geometry, and the use of different materials such as those set out in detail below.

Each vane block 40 may comprise an internal platform 42 and an external platform 44. These platforms (42; 44) are generally arched or curved in order to follow the circular shape of the corresponding shroud (32; 34). In addition, the stator may comprise internal shroud segments 46 in order to supplement an internal annular surface which delimits and guides the internal flow of the turbine engine. The term shroud segment 46 is intended to be understood to be an angular sector of a circle. In the same manner, the stator may comprise external shroud segments 48 between external platforms 44.

The internal segments 46 are advantageously produced from composite materials with glass or carbon fibers, and a PEI resin. The internal platforms 42 of the vane block 40 are interposed between the internal segments 46; they form an alternating arrangement. The alternating arrangement may be primarily regular. The stator may have a lower portion and an upper portion, the alternating arrangement being regular in each lower and upper portion.

Figure 4:
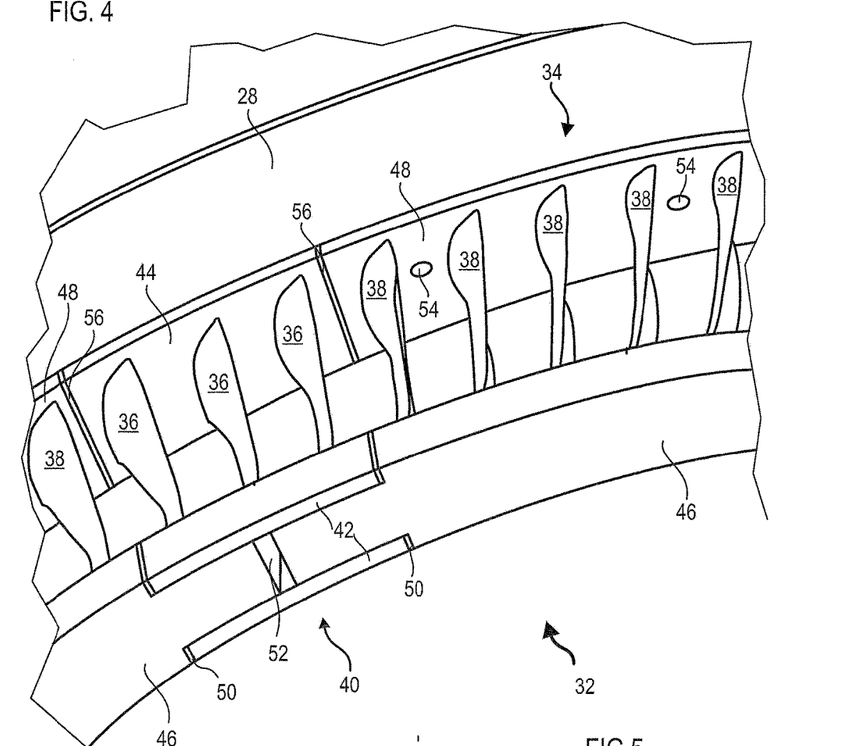
FIG. 4 illustrates a portion of the stator according to the present application.

FIG. 4 is an isometric view of a stator portion when viewed from the inner side of the stator. A portion of an annular row of vanes (36; 38), an external shroud 34, an internal shroud 32 and the external housing 28 can be seen.

The internal platform 42 of the vane block 40 enables two internal segments 46 to be connected. Joints 50 are arranged at the interfaces between the internal platforms and the internal shroud segments. These joints 50 ensure sealing and enable differential expansion since the internal platform 42 and the segments may be produced from different materials.

Inside the internal platform 42, the ends of the internal segments border a cell 52. This forms a play which again enables a differential expansion in order to allow the ends to be moved together along the circumference.

The external segments 48 are pressed against the internal surface of the external housing 28. They may be fixed at that location using through-shafts (not illustrated); in this regard, the external segments 48 have fixing holes 54. Any expansion joints 56 may be placed at the junctions between the external platforms 44 and the external segments 48.

Figure 5:
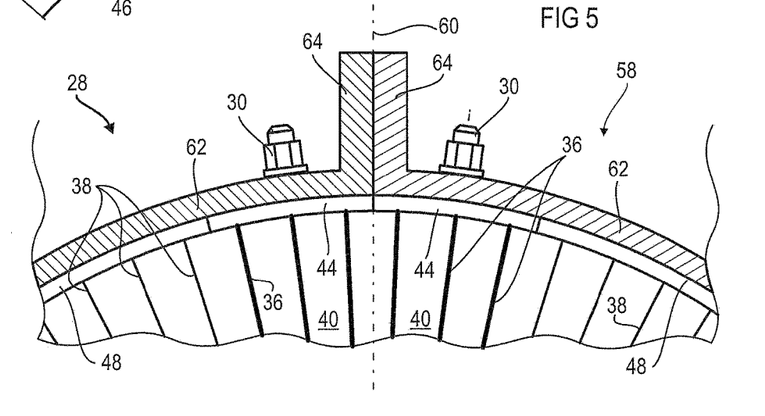
FIG. 5 illustrates the connection between half-shells of the stator according to the present application.

FIG. 5 shows a stator portion of a compressor such as that described in FIG. 2. It is possible to see therein the support vanes 36 of a vane block 40, connection vanes 36, external platforms 44, external segments 48 and a portion of an external housing 28.

The external housing may be that of the compressor, for example, a low-pressure compressor. This housing may be formed by two half-shells 58 which are separated along an axial plane 60; that is to say, which extend via the rotation axis of the turbine engine which corresponds to the general axis of symmetry of the toric shape of the stator. The axial plane 60 is illustrated vertically, in practice it may be horizontal relative to the normal assembly direction of the turbine engine. Each half-shell 58 comprises a semi-circular wall 62 which generally forms a half-tube or a half-ogive. The walls 62 terminate along the circumference as axial fixing flanges 64. These flanges 64 extend radially towards the outer side of the wall 62, at the side opposite the annular flow. Advantageously, each half-shell 58 is produced from a composite material in order to make it lighter whilst retaining its rigidity. Each half-shell 58 may be integral in order to improve the service-life, the rigidity and the sealing thereof.

At least one or each vane block 40 is fixed to the wall 62 of a half-shell 58 using a shaft 30, for example, with a lockbolt. This axis 60 is remote, along the circumference, from the adjacent axial flange 64 which facilitates the use of the locking tools of the lockbolts. At least one or each shaft 30 may be at the center of the associated external platform 44 between the edges thereof along the circumference.

Figure 6:
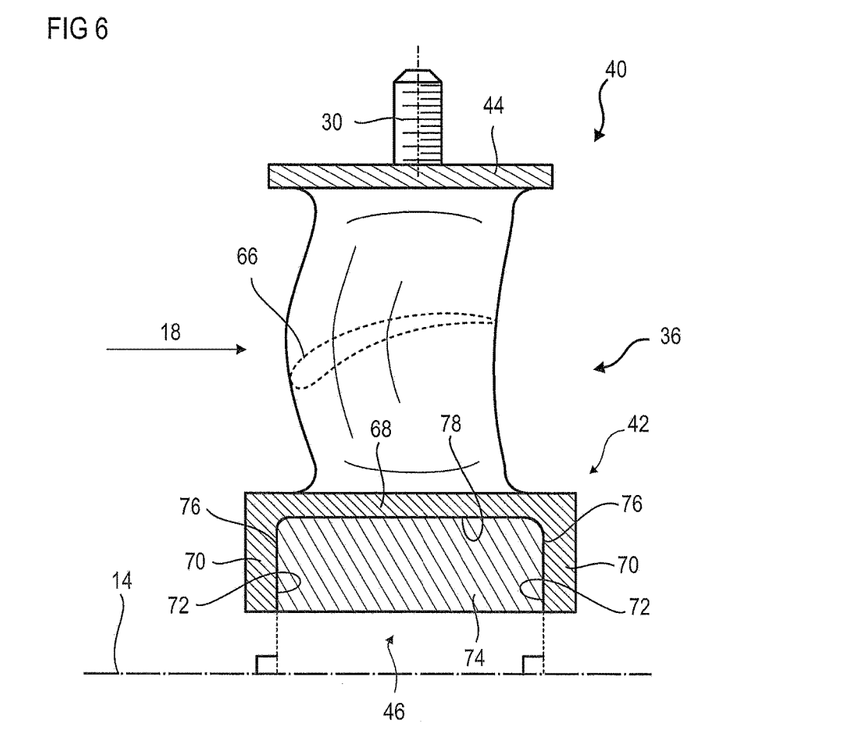
FIG. 6 illustrates a support vane of the stator according to the present application.

FIG. 6 shows a section of the stator in the region of a junction between an internal platform 42 and an internal segment 46. The section shows in particular a support vane 36 of a vane block 40; it could also be a separate support vane 36. The rotation axis 14 is indicated for the spatial orientation.

The support vane 36 and/or a vane block 40 with a plurality of support vanes (only one being illustrated in this instance) may be integral and may be produced by means of additive production based on powder, for example, a titanium powder, in order to promote the rigidity. This technology affords a large degree of freedom in terms of shapes which can be produced. However, this aspect of the present application is not indispensable since moulding can be used.

The external platform 44 may have a generally planar profile. It may include a fixing shaft 30 as set out above. The shaft 30 extends radially in the direction opposite the aerofoil of the vane 36. This may have a cambered aerodynamic profile 66 (illustrated in this instance as a top view), with a concave intrados surface. In particular, the radial ends of the aerofoil which are connected to the platforms (42; 44) are curved inwards. The general chord of the vane 36 is inclined relative to the rotation axis 14. The mean angle between the chord and the rotation axis, or pitch angle, is greater than 5°, preferably greater than 15°. This angle is measured in a plane parallel with the rotation axis 14. It may be measured on the profile at a radial mid-height of the aerofoil of the support vane 36.

This geometry improves the stiffness of the connection between a aerofoil and the platforms (42; 44) thereof, which further contributes to strengthening the vane block 40 to which it belongs. The term "aerofoil" is understood to be the portion of the vane which extends radially in the flow 18, the aerofoil may be delimited radially by shrouds and/or platforms.

The internal platform 42 may have a general profile which may be pivoted about the rotation axis in order to generate the internal platform 42. The profile may have an axial portion 68 which extends substantially axially. The profile may terminate axially as radial portions 70 which border the axial portion 68 and which extend substantially radially. The radial portions 70 may extend perpendicularly to the rotation axis 14. The axial portion 68 generally forms a tube portion. The radial portions 70 form radial flanges.

The internal platform 68 comprises at least one, preferably at least two, contact surface(s) 72, or facet(s) 72, which generally extends/extend radially and along the circumference of the stator. The contact surfaces 72 may be perpendicular to the rotation axis 14 and optionally parallel with each other. These contact surfaces 72 form a first set of contact surfaces 72 which are arranged at one end, or side, of the platform 42 along the circumference. The internal platform 42 may have another set of similar contact surfaces 72, the set being placed at the opposite end of the platform 42 along the circumference. Each pair of contact surfaces 72 enables an assembly portion 74 of a shroud segment which is placed between them to be axially blocked.

The internal platform 42, via the axial portion 68 and the radial portions 70 thereof, may delimit a groove between the contact surfaces 72 thereof. The groove may form an angular portion of an annular groove which is open radially towards the inner side. The groove receives at least one or two assembly portions 74 of internal segments 46. Each assembly portion comprises corresponding contact surfaces 76 which are in contact with the contact surfaces of the internal platform 42. Each outer surface 76 of the assembly portion 74 of the segment conforms to the inner surface of the groove of the internal platform. The surfaces (76; 78) may be adjusted mechanically in order to ensure fitting or interlocking. The platform 42 acts as a sleeve which fixedly connects two shroud segments 46. This result is achieved by reducing the tolerances and by producing a force-fitting; that is to say, by applying a force greater than 10 N, preferably greater than 100 N, so that the segment is introduced into the platform.

The contact surfaces 72 are opposite each other, inside a platform 42 with a profile in the form of an inverted "U". According to a variant of the present application, they could be orientated in mutually opposed directions, for example, by being formed on the same central radial flange. The profile of the platform may be in the form of the letter "T". In this variant, the shroud segment has a fork-like shape which grips the central radial flange.

Figure 7:
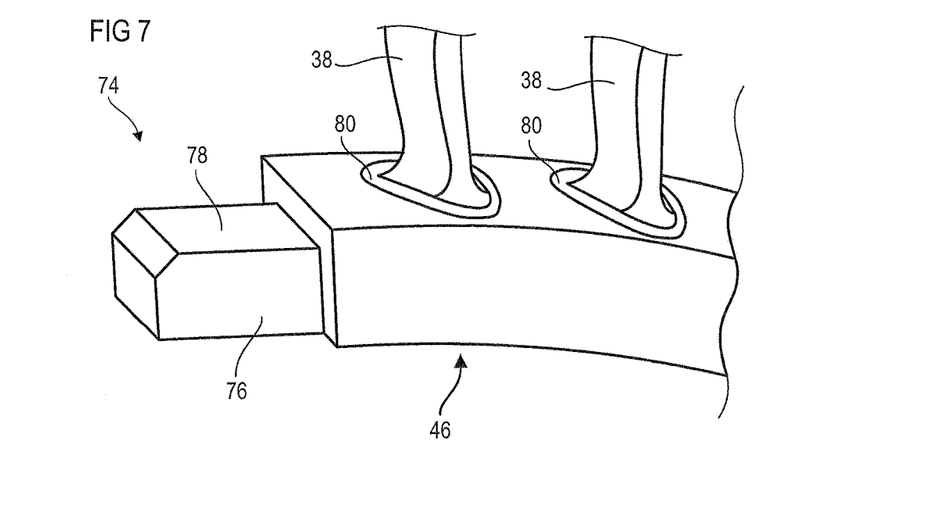
FIG. 7 illustrates a segment portion of an internal shroud of the stator according to the present application.

FIG. 7 shows an internal stator portion of a compressor such as the one described in FIG. 2. It is possible to see a series of connection vanes 38 and an internal segment 46.

The assembly portion 74 forms a zone of lesser radial thickness and/or lesser width in the axial direction. This portion 74 has a reduced cross section relative to the remainder of the segment 46 and relative to the inner platform in which it is intended to be accommodated. In this manner, a continuity of surface is ensured.

The, or each, internal segment 46 has a pair of corresponding contact surfaces 76 at each end, the ends extending along the circumference. The pairs thus enable a segment 46 to be fitted between two support vanes or two vane blocks, in particular via their internal platforms. In this manner, the succession of connections between the internal platforms and the segments 46 forms a rigid arch or circle as a result of the repeated interlocking actions.

The internal segments 46 comprise openings 80 or cavities 80 for introducing the internal ends of the connection vanes 38 therein. They are fixed in the openings or the cavities using retention elements such as a plate or a rod which is introduced into a cut-out of the end of the connection vane 38. The fixing may also be carried out using a sealing material which fills a cavity 80 or blocks an opening 80. An elastomer joint, such as silicone, may be used.

In the above description, each feature set out for a vane block may apply to a separate support vane and vice versa.

I claim:

1. A stator assembly for an axial turbine engine, said stator comprising:

an annular row of stator vanes which comprises integral support vanes with internal platforms, and connection vanes;

an internal shroud formed by the internal platforms of the support vanes and by internal shroud segments which are fixed to the connection vanes, the internal platforms of the support vanes and the internal shroud segments having the same axial length;

at least one integral vane block which comprises a plurality of support vanes and one of the internal platforms which is common to each of the support vanes of the integral vane block, and an external platform which is common to each of the support vanes of the integral vane block, wherein
   said one of the internal platforms comprises four contact surfaces which are generally perpendicular to the rotation axis of the turbine engine and which are axially in contact with two of the internal shroud segments, each of the two internal shroud segments being in contact with two of the four contact surfaces of said one of the internal platforms, wherein said one of the internal platforms comprises an internal U-shape groove which is radially open towards the inner side, said two internal shroud segments each comprising a portion of smaller radial and axial thickness which is introduced into the internal U-shape groove.

2. The stator assembly in accordance with claim 1, wherein the vane block comprises three support vanes which describe an angular portion of the annular row of vanes.

3. The stator assembly in accordance with claim 1, wherein two of the four contact surfaces form a pair of contact surfaces which are in contact with the same internal shroud segment and which are orientated axially in opposing directions.

4. The stator assembly in accordance with claim 1, wherein each of the internal shroud segments is adjusted mechanically to each of the internal platforms with which it is in contact in order to enable retention by means of interlocking.

5. The stator assembly in accordance with claim 1, wherein the internal shroud segments are interposed between the internal platforms of support vanes, the internal shroud segments and the platforms forming an alternating arrangement which is generally regular.

6. The stator assembly in accordance with claim 1, wherein at least one or each support vane is integral and produced by additive manufacturing based on powder.

7. The stator assembly in accordance with claim 1, wherein at least one internal segment is produced from a composite material including fibres and an organic matrix.

* * * * *